No. 638,715. Patented Dec. 12, 1899.
H. L. HOPKINS.
CUTTING APPARATUS FOR MOWERS AND REAPERS.
(Application filed Feb. 25, 1899.)

(No Model.) 2 Sheets—Sheet 1.

Witnesses.
D. W. Edelin.
J. C. Hutchinson, Jr.

Inventor.
H. L. Hopkins
By his attorneys
Ranier & Crockborough

THE NORRIS PETERS CO., PHOTO-LITHO., WASHINGTON, D. C.

No. 638,715. Patented Dec. 12, 1899.
H. L. HOPKINS.
CUTTING APPARATUS FOR MOWERS AND REAPERS.
(Application filed Feb. 25, 1899.)
(No Model.) 2 Sheets—Sheet 2.
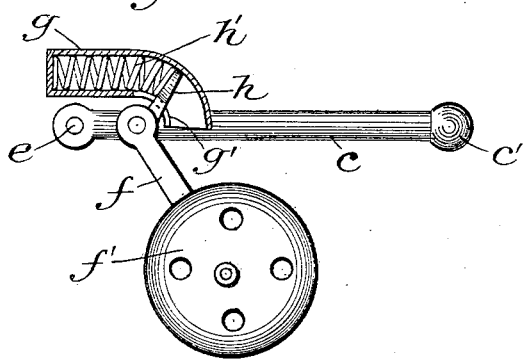
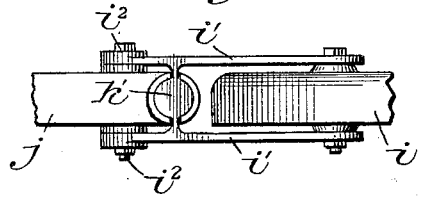
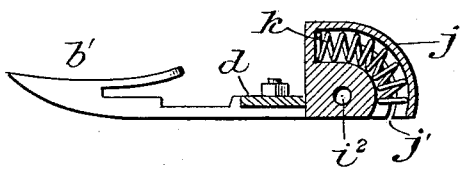
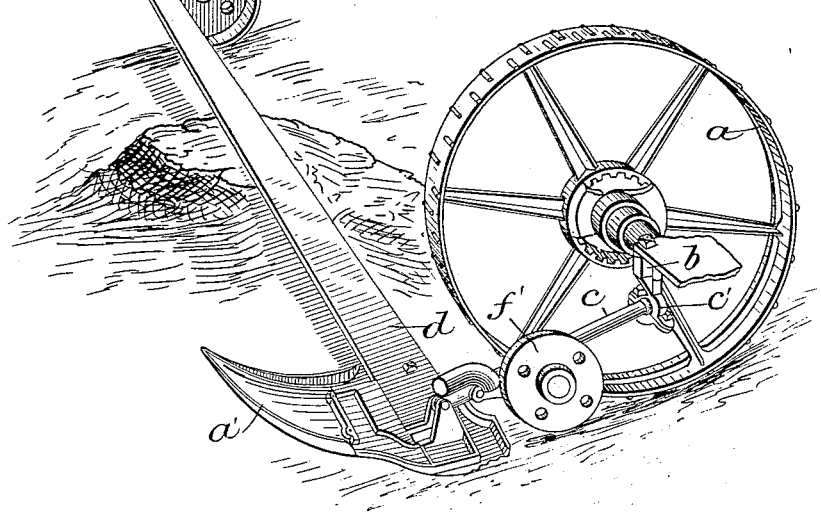
Witnesses:
D. W. Edelin.
J. E. Hutchinson Jr.
Inventor:
H. L. Hopkins
By his attorneys
Raimes & Goldsborough

UNITED STATES PATENT OFFICE.

HARVEY L. HOPKINS, OF MOLINE, ILLINOIS, ASSIGNOR OF TWO-THIRDS TO CHARLES H. POPE, OF SAME PLACE, AND MERWIN D. HOPKINS, OF WEST EATON, NEW YORK.

CUTTING APPARATUS FOR MOWERS AND REAPERS.

SPECIFICATION forming part of Letters Patent No. 638,715, dated December 12, 1899.

Application filed February 25, 1899. Serial No. 706,762. (No model.)

*To all whom it may concern:*

Be it known that I, HARVEY L. HOPKINS, a citizen of the United States, residing at Moline, in the county of Rock Island, State of Illinois, have invented certain new and useful Improvements in Cutting Apparatus for Mowers and Reapers; and I do hereby declare the following to be a full, clear, and exact description of the invention, such as will enable others skilled in the art to which it appertains to make and use the same.

The general object of the invention is to enable the employment in mowers and reapers of cutter-bars of increased length and to effect a clean separation of the swath from the standing grass as the machine makes its rounds. It is of course apparent that the longer the cutter-bar the wider the swath and that the machine cutting the widest swath with a given amount of power will do the most work in a given time; but until recent years the length of these bars has been kept down to rather narrow limits, owing to the unavoidable increase in weight of the longer bars and the amount of side draft incident to this extra weight and the drag and friction of such bars on the ground. The purpose of my present invention is to do away with these disadvantages and make it perfectly practicable to employ bars of very much greater length without materially adding to the side or direct draft of the machine, and this I accomplish by the hereinafter described and claimed novel manner of supporting the weight of the entire cutting apparatus.

The invention is fully illustrated in the accompanying drawings, wherein—

Figure 1:
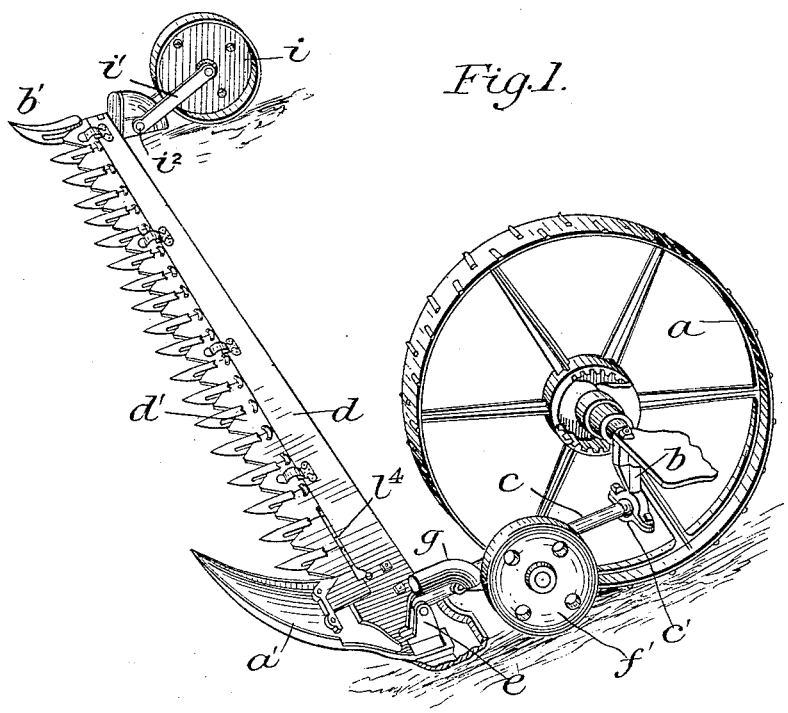
Figure 2:
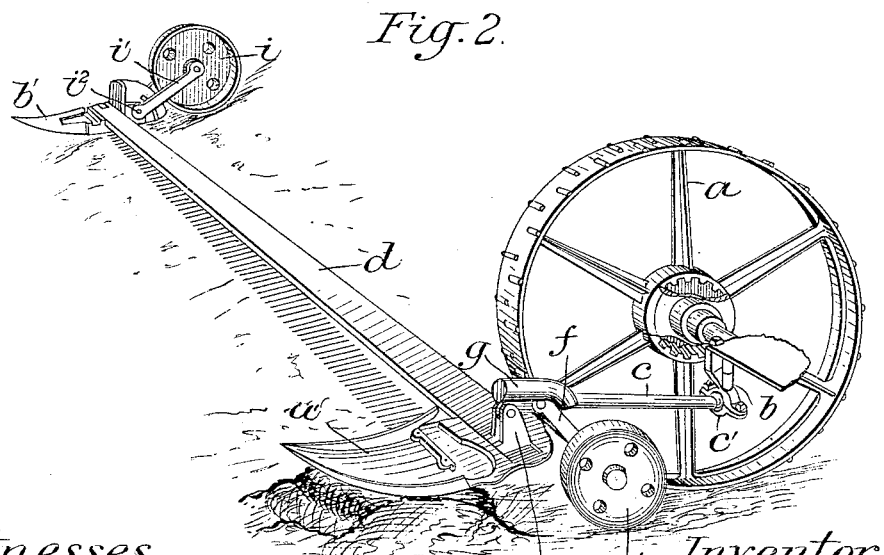

Figures 1, 2, and 3 are similar perspective views of the cutting apparatus of a mower looking at the inner shoe from a point in front and slightly outside the same, Fig. 1 showing the position of the parts when moving over an even surface, Fig. 2 illustrating the position of the same parts when the inner shoe is riding over an elevation, and in Fig. 3 the parts being shown in the position they take when an elevation is encountered that comes between the shoes. Figs. 4, 5, and 6 are detail views of the inner and outer carrying-wheels and their connections.

The cutting apparatus as heretofore constructed has usually been supported by carrying-wheels rigidly connected to it at opposite ends of the finger-bar; but such wheels have been objectionable mainly because they must rise and fall with the up-and-down movement of the apparatus. In traveling over an even surface these wheels carry the cutting apparatus by supporting the finger-bar slightly above the ground; but in passing over a mound or elevation between the carrying-wheels the finger-bar rides upon the surface and lifts and carries the wheels with it, and as the surface of the finger-bar is much greater than that of the carrying-wheels it follows that in passing over uneven ground the cutting apparatus carries the wheels more than the wheels carry the cutting apparatus. Such wheels are therefore a hindrance except on even surfaces, so much so that some prominent manufacturers have discarded them altogether; but such wheels would be of great advantage if they could be arranged to follow the uneven surface of the ground, so as at all times to carry most of the weight of the cutting apparatus, and this I accomplish by locating the wheels so as to trail in rear of the bar and making the elastic connection between them and the cutting apparatus shown on Sheets 1 and 2 of the drawings and which I will now describe.

Referring to Figs. 1 to 3, $a$ denotes the inner one of the driving-wheels of a mower of ordinary or any desired construction. An extension of the frame is shown at $b$ projecting below the axle, and $c$ indicates the usual thrust-bar, having a universal-joint connection $c'$ with the extension $b$. The inner shoe is denoted by $a'$, the outer shoe by $b'$, while $d$ indicates the finger-bar and $d'$ the cutter-bar. So far as the manner of elastically supporting and carrying the cutting apparatus is concerned the construction of these individual parts is immaterial and may be varied as desired.

The inner shoe has a rocking or tilting connection with the front end of the thrust-bar by means of the pivotal joint $e$, and in rear of this tilting connection there is pivoted to the bar $c$ a rearwardly-extending arm $f$, which carries at its outer end the wheel $f'$. Secured to the thrust-bar, near its front end, is a tubular housing or barrel $g$, the rear portion of which is concentric to the pivot of the wheel-carrying arm. The front end of the housing is closed and its rear end open, and it is slotted longitudinally at $g'$ for the purpose of receiving a follower-arm $h$, which projects from the arm $f$ of the carrying-wheel. A stout coiled spring $h'$ is inclosed within this housing and reacts between its closed front end and the follower $h$. The wheel $f'$ rests upon the ground, and the weight of the cutting apparatus bearing down on the shoe compresses the spring more or less, according to the rising and falling movements of the inner end of the cutting apparatus, which is thus at all times elastically supported. The spring is compressed most and is therefore strongest when the cutting apparatus is in its normal position on even ground. This is shown in Fig. 1, and in this position the weight carried by the wheel is the same as would be carried by it were it rigidly connected in the old way. The spring is compressed the least and is therefore weakest when the inner end of the cutting apparatus is passing over an obstruction, as best shown in Fig. 2. The spring becomes weaker as the carrying-arm $f$ moves toward the extreme and nearly-upright position shown in this figure; but as it becomes weaker less strength is required of it to carry the same weight, because the effective leverage of the arm becomes greater as the cutting apparatus rises. The normal tension or strength of the spring will of course vary with different sizes, weights, and makes of cutting apparatus, and each maker will determine this for himself. As a general rule the spring must not have sufficient tension to carry the entire weight of the shoe and inner end of the cutting apparatus except over even surfaces, as shown in Fig. 1; but the weight of these parts should slightly overbalance the spring, so that the inner end of the cutting apparatus will follow the undulations of the ground and not be lifted off it.

I connect the carrying-arm $f$ to the thrust-bar $c$, as described, so as to lift on the cutting apparatus at the point of its pivoted or tilting connection with the inner shoe. This permits the cutting apparatus to rock or tilt automatically or to be rocked or tilted more easily than if connected directly to the inner shoe, which is particularly valuable in connection with the automatic tilting arrangement illustrated and described in my patent of November 11, 1884, No. 307,948.

Although I show the wheel-carrying arm pivotally connected to the thrust-bar, I do not desire to be limited to such arrangement. The fullest benefit from the invention is obtained by employing the carrying-wheel in machines having a tilting or rocking connection between the inner shoe and the thrust-bar and pivoting the arm $f$ to the latter bar; but where no such provision is made the wheel-carrying arm may be pivoted directly to the shoe.

In machines having the tilting provision the location of the pivot between the shoe and the thrust-bar is important, for if the cutting apparatus be well balanced on this pivot it may rock or tilt one way as easily as the other; but if the pivot be located forward or backward the ease of tilt will be correspondingly effected. Manufacturers will therefore locate this pivot to meet the requirements of their respective machines.

The carrying-wheel for the outer end of the cutting apparatus is indicated at $i$ and its carrying-arm at $i'$. This arm is bifurcated, as shown in Fig. 4, and has the wheel $i$ journaled between its members at their outer ends. At its forward end the arm is pivotally connected to an extension of the outer shoe at $i^2$ in rear of the finger-bar, its arms or bifurcations embracing the shoe extension and strengthening and steadying the same. The shoe extension has formed on it a tubular housing or barrel $j$, which is concentric with the pivot of the wheel-carrying arm. The side walls of this housing are slotted, as at $j'$, to permit the follower $k'$, which projects from the arm $i'$, to pass back and forth therein in substantially the same way as the follower $h$ on the arm carrying the wheel $f'$. A coiled spring $k$, similar to the one in the barrel $g$, is inclosed in the housing $j$ and reacts between the front closed end of the same and the follower. The wheel $i$ and its carrying-arm $i'$ are shown in normal position in Fig. 1, where the cutting apparatus is represented as passing over even ground. When the outer end of the finger-bar is raised in passing over an obstruction, as shown in Fig. 3, the wheel-carrying arm $i'$ is nearly upright, like the position of the arm $f'$ of the inner end carrying-wheel in Fig. 2, and the operation is substantially the same. The spring $k$ must not have sufficient strength or tension to carry the entire weight of the outer end, except when in the position shown in Fig. 1, and the spring must be slightly overbalanced, so that the outer end, like the inner one, may run lightly over the surface without being actually lifted from the ground. These spring-carrying wheels give to the cutting apparatus an ease of movement and elasticity in passing over uneven ground that greatly reduces both the side and direct draft, the former more especially at the outer end of the finger-bar, because of its distance from the line of draft. It is also obvious that they will materially assist in raising, turning, and backing the cutting apparatus. The position of the wheels at the rear of their respective shoes is important, for the reason that when the machine is backed over uneven ground the wheels double under, as shown in Fig. 2 and at the outer shoe in Fig. 3. This doubling under of the spring-wheels raises the cutting apparatus automatically in backing and turning, as in turning a cutting apparatus is necessarily backed.

I do not wish to be limited to coiled springs; but I have found that flat springs cannot be arranged so as to obtain the full benefit of the invention. I am also aware that it has been proposed to mount spring-supported carrying-wheels on arms that project forwardly of the guards. Such wheels are, however, entirely impracticable, for the reason that in mowing over uneven surfaces they tend to double under and lift the cutting apparatus from the ground, and have therefore never, so far as I am aware, gone into actual use.

Except where hereinafter specifically claimed, I do not desire nor intend to be limited to the details of construction of any of the features of invention heretofore described, believing that the scope of the invention admits of considerable variation in these details without departure from the spirit or gist of the improvements.

Having thus described my invention, what I desire to secure by Letters Patent is—

1. In mowers and reapers, the combination with the cutting apparatus, of a carrying-wheel in rear of the finger-bar, and a spring reacting between the wheel and the cutting apparatus.

2. In mowers and reapers, the combination with the cutting apparatus, of a trailing carrying-wheel, and a spring reacting between the same and the cutting apparatus.

3. In mowers and reapers, the combination with the cutting apparatus, of an arm pivoted to the outer shoe in rear of the finger-bar, a trailing carrying-wheel journaled in the arm, and a spring reacting between the arm and the shoe.

4. In mowers and reapers, the combination with the cutting apparatus, of an arm pivoted to the thrust-bar in rear of the inner shoe, and a trailing carrying-wheel journaled in the arm, and a spring reacting between the arm and the thrust-bar.

5. In mowers and reapers, the combination with the cutting apparatus, of the arm $i'$, pivoted to the outer shoe, the housing $j$ secured to the shoe in rear of the finger-bar, a carrying-wheel journaled in the arm, and a spring inclosed within the housing, and reacting between the same and a follower $k'$ projecting from the wheel-carrying arm.

6. In mowers and reapers, the combination with the cutting apparatus, of the arm $f$, pivoted to the thrust-bar, the housing $g$ secured to the bar, a carrying-wheel $f'$ journaled in the outer end of the arm, and a spring inclosed within the housing, and reacting between the same and a follower $h$ projecting from the wheel-carrying arm.

7. In mowers and reapers, the combination with the cutting apparatus, of the bifurcated arm $i'$, pivoted to the outer shoe, a tubular housing $j$ secured to the shoe concentrically to the pivot of the arm, a carrying-wheel journaled in the outer end of the arm, a follower $k'$ projecting from the arm into the housing, and a coiled spring inclosed in said housing and reacting between the same and the follower.

8. In mowers and reapers, the combination with the cutting apparatus, of a thrust-bar $c$ pivoted to the inner shoe, an arm $f$ pivoted to the thrust-bar in rear of its pivotal connection with the shoe, a carrying-wheel journaled in the outer end of the arm, a tubular housing $g$ secured to the thrust-bar and having a part concentric to the pivot of the wheel-carrying arm, a follower $h$ projecting from said arm into the housing, and a spiral spring inclosed in the housing and reacting between it and the arm.

9. In mowers and reapers, the combination with the cutting apparatus, of an inner shoe having a tilting connection with the thrust-bar, a trailing wheel carried by an arm $f$ pivoted to the bar in rear of its pivotal connection with the shoe, a spring reacting between the thrust-bar and wheel-carrying arm, a trailing wheel carried by an arm $i'$ pivoted to the outer shoe in rear of the finger-bar, and a spring reacting between said shoe and the outer wheel-carrying arm.

10. In mowers and reapers, the combination with the cutting apparatus, of a thrust-bar pivotally connected therewith so as to allow the guards to rock or tilt, a pivoted rearwardly-extending arm, a trailing carrying-wheel journaled in the arm in the rear of the shoe, and a spring reacting between the arm and the bar.

11. In mowers and reapers, the combination with the cutting apparatus, of a thrust-bar pivotally connected therewith so as to allow the guards to rock or tilt, an arm pivoted to the bar in rear of the shoe, a trailing carrying-wheel journaled in the arm, and a spring reacting between the arm and the bar.

In testimony whereof I affix my signature in presence of two witnesses.

HARVEY L. HOPKINS.

Witnesses:
M. D. HOPKINS,
S. J. HOPKINS.